United States Patent
Taniguchi et al.

(10) Patent No.: US 8,751,446 B2
(45) Date of Patent: Jun. 10, 2014

(54) TRANSFERENCE CONTROL METHOD, TRANSFERENCE CONTROL APPARATUS AND RECORDING MEDIUM OF TRANSFERENCE CONTROL PROGRAM

(75) Inventors: Kazuhiro Taniguchi, Kawasaki (JP); Tomoaki Mizoo, Kobe (JP)

(73) Assignee: Fujitsu Limited, Kawasaki (JP)

( * ) Notice: Subject to any disclaimer, the term of this patent is extended or adjusted under 35 U.S.C. 154(b) by 64 days.

(21) Appl. No.: 13/470,463

(22) Filed: May 14, 2012

(65) Prior Publication Data

US 2013/0006930 A1 Jan. 3, 2013

(30) Foreign Application Priority Data

Jun. 30, 2011 (JP) ................................ 2011-146631

(51) Int. Cl.
*G06F 17/30* (2006.01)
(52) U.S. Cl.
USPC .......................................... 707/625; 707/637
(58) Field of Classification Search
USPC .................................................. 707/625, 637
See application file for complete search history.

(56) References Cited

U.S. PATENT DOCUMENTS

| 6,453,325 B1 * | 9/2002 | Cabrera et al. .......................... 1/1 |
| 2005/0210073 A1 | 9/2005 | Oeda et al. |
| 2009/0172142 A1 * | 7/2009 | Hanai et al. .................... 709/223 |
| 2010/0274759 A1 * | 10/2010 | Takeuchi et al. .............. 707/624 |

FOREIGN PATENT DOCUMENTS

| JP | 2005-210606 | 8/2005 |
| JP | 2005-267301 | 9/2005 |
| JP | 2010-157884 | 7/2010 |

OTHER PUBLICATIONS

Oracle, Guide to Hot Standby Databases, 1996.*
Oracle, Oracle Data Guard, Aug. 2008.*

* cited by examiner

*Primary Examiner* — William Spieler
(74) *Attorney, Agent, or Firm* — Staas & Halsey LLP

(57) ABSTRACT

A transference control apparatus includes a communication controller, and a processor that executes a procedure, the procedure including processing a control that causes first processing, in which an update log representing the update content of updating performed for a first database is transmitted, by the communication controller, to a second database serving as a copy destination for the first database, to be performed with priority over second processing, in which transmission target data contained in the first database is transmitted to the second database, and restraining, in the case that updating of the transmission target data is allowed in the first database, the control that causes the first processing to be performed with priority.

12 Claims, 25 Drawing Sheets

FIG. 6

| CP TYPE | DATABASE RESOURCE ID | UPDATE STATUS DATA |

FIG. 8

| OPERATION TYPE | DATABASE RESOURCE ID | PRIMARY KEY | UPDATED DATA |
|---|---|---|---|

FIG. 10

| QUEUE TYPE |
|---|
| DATABASE RESOURCE ID |
| ADDRESS OF NEXT REQUEST |
| ADDRESS OF TRANSMISSION BUFFER |

FIG. 11

| DATABASE RESOURCE ID |
| --- |
| PRIORITY LEVEL |
| OVERALL SIZE |
| GUARANTEED COMPLETION TIME |
| AMOUNT OF TRANSMITTED DATA |
| TRANSMISSION START TIME |
| ADDRESS OF NEXT ENTRY |

FIG. 14

| DATABASE RESOURCE ID | S1: COMPANY TABLE |
|---|---|
| PRIORITY LEVEL | LOW |
| OVERALL SIZE | 5 MEGABYTES |
| GUARANTEED COMPLETION TIME | 13:00 5/12/2011 |
| AMOUNT OF TRANSMITTED DATA | – |
| TRANSMISSION START TIME | – |
| ADDRESS OF NEXT ENTRY | – |

FIG. 16

| DATABASE RESOURCE ID | S1: COMPANY TABLE |
|---|---|
| PRIORITY LEVEL | LOW |
| OVERALL SIZE | 5 MEGABYTES |
| GUARANTEED COMPLETION TIME | 13:00 5/12/2011 |
| AMOUNT OF TRANSMITTED DATA | 3.6 MEGABYTES |
| TRANSMISSION START TIME | 8:00 5/12/2011 |
| ADDRESS OF NEXT ENTRY | — |

TRANSFERENCE CONTROL METHOD, TRANSFERENCE CONTROL APPARATUS AND RECORDING MEDIUM OF TRANSFERENCE CONTROL PROGRAM

CROSS-REFERENCE TO RELATED APPLICATION

This application is based upon and claims the benefit of priority of the prior Japanese Patent Application No. 2011-146631, filed on Jun. 30, 2011, the entire contents of which are incorporated herein by reference.

FIELD

The embodiments discussed herein are related to transference control.

BACKGROUND

As a method for realizing database (DB) duplication for the purpose of one of countermeasures against disaster, load distribution, and so on, a method is available in which a log representing an update result of a copy source database based on a structured query language (SQL) application in a primary system is transmitted to and used in a copy destination database in a secondary system.

In such a database duplication system, a fault may occur from which self-recovery by the secondary system is not possible. In this case, by extracting DB data to be transmitted to the secondary system, transferring the extracted DB data to the secondary system, and storing the DB data transmitted from the primary system in the copy destination database, the copy destination database may be logically restored using the DB data from the copy source database.

Data synchronization techniques in a database duplication system include, for example, the technique described next. That is, a primary storage system transfers, by synchronous remote copying, write data written to a log logical disk to a secondary storage system on a recovery site. The primary storage system also transfers, by asynchronous remote copying in which the writing order is guaranteed, write data written to a DB data logical disk to the secondary storage system on the recovery site. The log logical disk and the DB data logical disk are discriminated from each other. The write data is data written to the primary storage system as a result of a transaction but is not data separately extracted for recovery or the like.

SUMMARY

According to an aspect of the invention, a transference control apparatus includes a communication controller, and a processor that executes a procedure, the procedure including processing a control that causes first processing, in which an update log representing the update content of updating performed for a first database is transmitted, by the communication controller, to a second database serving as a copy destination for the first database, to be performed with priority over second processing, in which transmission target data contained in the first database is transmitted to the second database, and restraining, in the case that updating of the transmission target data is allowed in the first database, the control that causes the first processing to be performed with priority.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of the format of a checkpoint log;

FIG. 8 illustrates an example of the format of an update log;

FIG. 10 illustrates an example of the data format of an entry of a queue;

FIG. 11 illustrates an example of the format of an entry of a management table;

FIG. 14 illustrates an example of an entry of a management table;

FIG. 16 illustrates an example of an entry of a management table;

DESCRIPTION OF EMBODIMENTS

An example of the outline and state of a system configuration according to an embodiment will be explained with reference to FIGS. 1 to 3.

Figure 1:
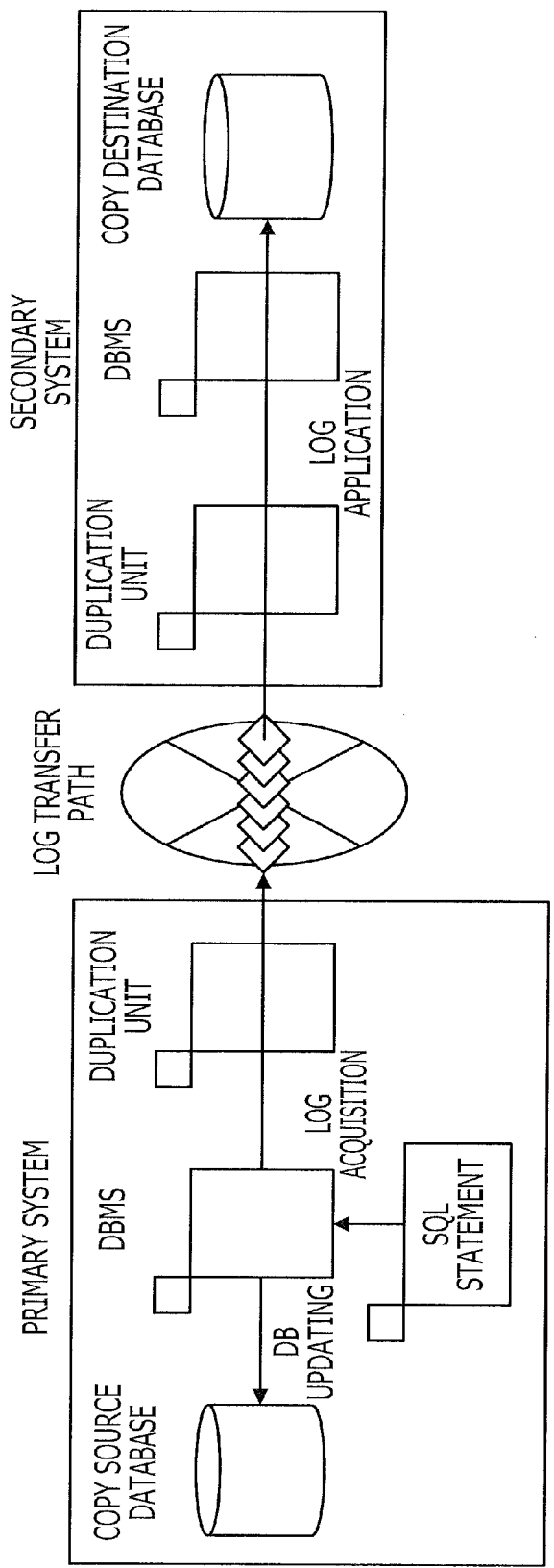
FIG. 1 illustrates an example of a database duplication system.
Figure 2:
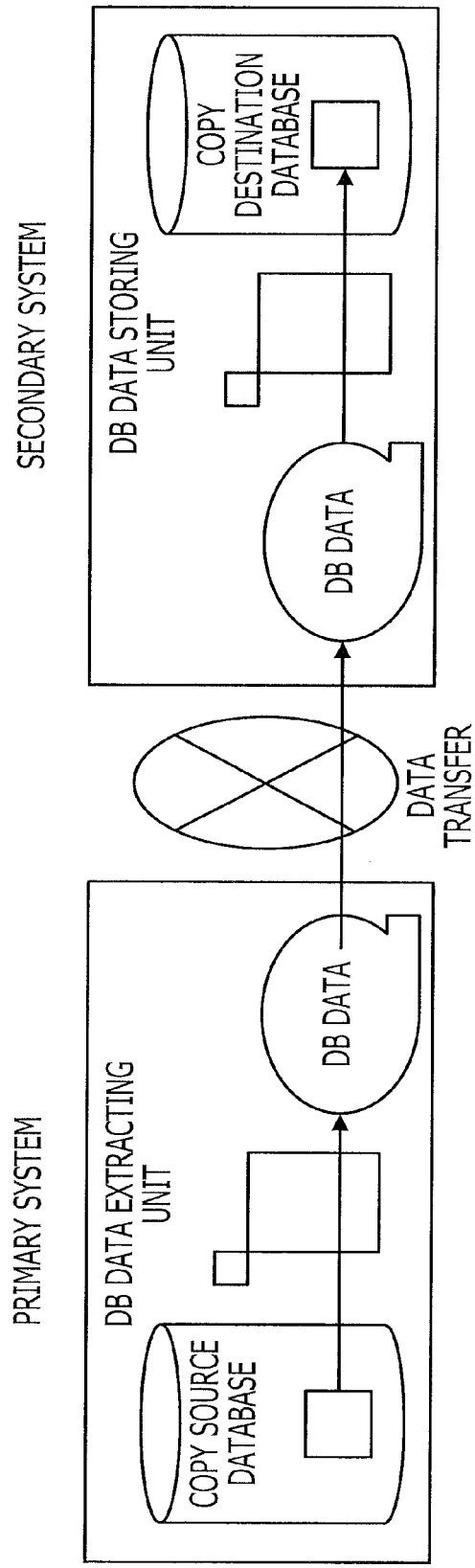
FIG. 2 illustrates an example of data extraction from a database.

As illustrated in FIG. 1, a database management system (DBMS) in a primary system updates, in accordance with an SQL statement received from an application, a copy source database and generates an update log. A duplication unit in the primary system acquires the update log, and transmits the update log to a duplication unit in a secondary system via a log transfer path. When receiving the update log, the duplication unit in the secondary system issues to a DBMS in the secondary system an instruction to apply the update log. In accordance with the instruction, the DBMS in the secondary system applies the log to a copy destination database in the secondary system. The log transfer path may be a network or a disk device with remote copying.

The method described above has the following advantage compared to a method for duplicating the disk volume in which data in a database resides. That is, the amount of data transfer between systems is smaller, and a secondary system may be utilized (for example, for a reference service) while duplication of a database continues.

In a database duplication system such as the database duplication system described above, a fault from which self-recovery by the secondary system is not possible may occur. In this case, as illustrated in FIG. 2, DB data to be transmitted to the secondary system is extracted using a DB data extracting unit of the DBMS, and the extracted DB data is transferred to the secondary system. Then, by storing the DB data, which has been transmitted from the primary system, into the copy destination database using a DB data storing unit of the DBMS in the secondary system, the copy destination database may be logically restored using the DB data from the copy source database. Similarly to the case of the log transfer path, the DB data may be transferred using a network or a disk device with remote copying.

The primary system includes a copy source database that includes a plurality of database resources used for a plurality of services, a DBMS that manages the copy source DB, a duplication unit, and a DB data extracting unit that extracts part of data in the copy source DB for recovery or the like. The secondary system includes a copy destination DB that is to store data identical to that stored in the copy source DB, a DBMS that manages the copy destination DB, a duplication unit, and a DB data storing unit. The primary system and the secondary system are connected via a transfer path.

Figure 3:
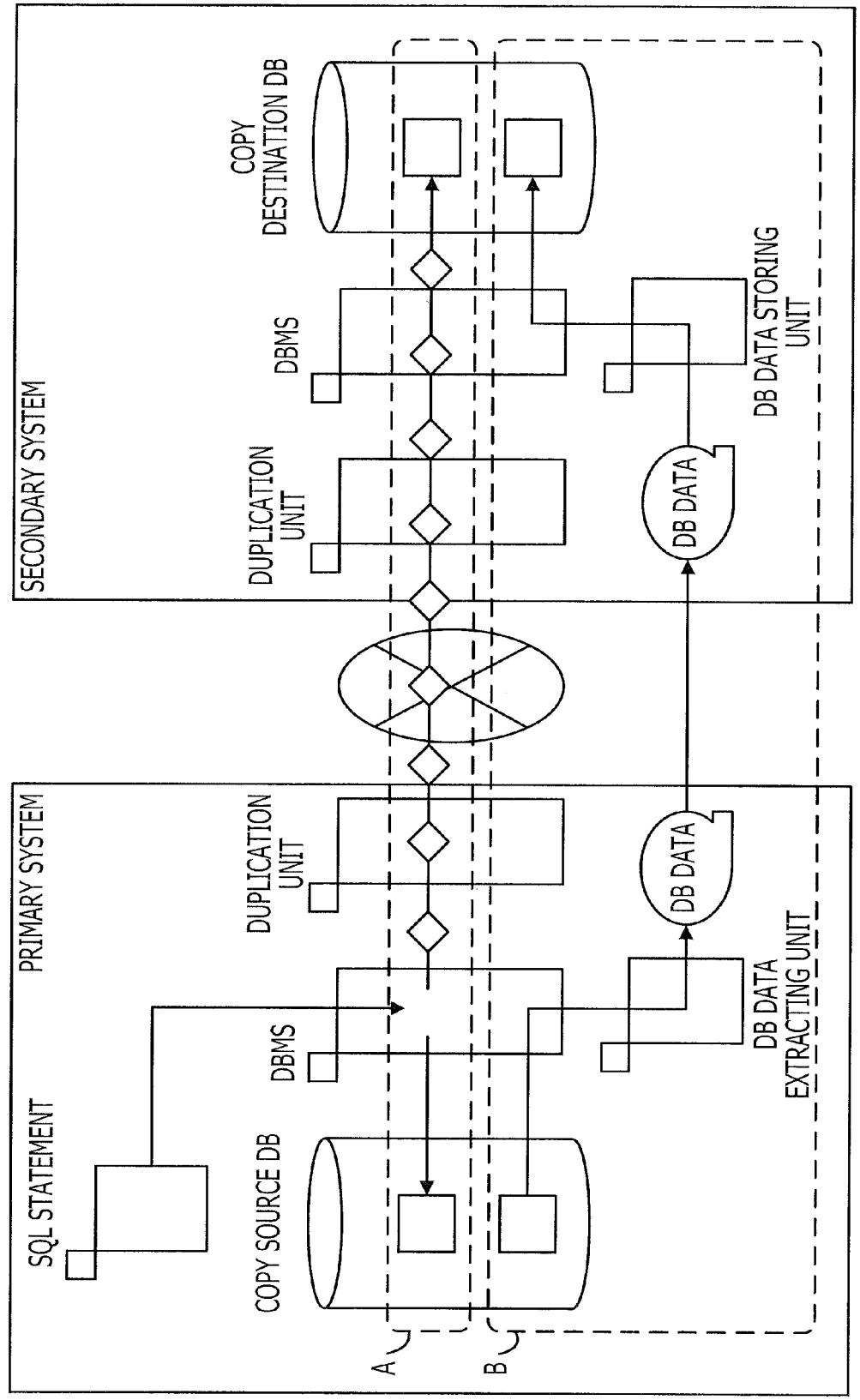
FIG. 3 illustrates an example of a system according to an embodiment.

For example, as indicated by the dotted-line rectangle A in FIG. 3, when an SQL statement which involves DB updating for a certain service is input to the DBMS of the primary system, the DBMS updates the copy source DB and generates an update log for the updating. The duplication unit of the primary system transmits the generated update log to the secondary system via the transfer path. The duplication unit of the secondary system receives the update log from the primary system, and outputs the received update log to the DBMS of the secondary system. The DBMS updates the copy destination DB. The updating of the copy destination DB is identical to the updating of the copy source DB. Accordingly, synchronization of data between the copy source DB and the copy destination DB may be achieved.

In a case such as where, for example, a fault occurs concerning a database resource in the copy destination DB, the DB data extracting unit extracts DB data in the database resource and transmits the extracted DB data to the secondary system via the same transfer path as that used to transfer an update log, in accordance with an instruction from an administrator or the like, as indicated by a dotted-line rectangle B in FIG. 3. The DB data storing unit of the secondary system outputs the DB data transmitted from the primary system to the DBMS of the secondary system, and causes the DBMS of the secondary system to store the DB data into the copy destination DB.

As described above, it is assumed that an update log and DB data are transmitted across the transfer path between the primary system and the secondary system occurs. For the database resource that is operating normally as indicated by the dotted-line rectangle A, it is desirable that synchronization of data between the copy source DB and the copy destination DB be achieved as quickly as possible. This is because the secondary system may have other uses such as being separately used for reference.

In contrast, for the database resource that is performing a recovery operation as indicated by the dotted-line rectangle B, the service may completely be stopped, or the service may be asked to continue even though the copy destination DB is also originally meant to be used in terms of the characteristics and the like of the service but unavoidably only the copy source DB may be used. Even if the service is completely stopped, there may be little time left to restart the service, or there may be enough time left to restart the service.

The processing for causing the DB data extracting unit of the primary system to extract DB data and the processing for causing the DB data storing unit of the secondary system to store DB data impose loads on the copy source DB and the copy destination DB respectively. In general, however, some load distribution is done in database designing, and the loads do not greatly affect the service. Regarding the transfer path, the data transfer amount significantly differs between where only an update log is transferred and where both DB data and an update log are transferred. Thus, transfer of DB data through the transfer path without any consideration may greatly affect the service that is normally operating as indicated by the dotted-line rectangle A.

In view of the above-described points, it is desirable that DB data be transferred to the extent that the transfer of DB data does not to affect the transfer of an update log. That is, transfer of an update log is prioritized as much as possible. However, for transfer of DB data, the transfer status is changed to take into account at least one of the transfer status of DB data and the service operating status, which includes whether a service using a database resource in which a fault has occurred is stopped or operating and whether or not the time to restart the service is close.

Figure 4:
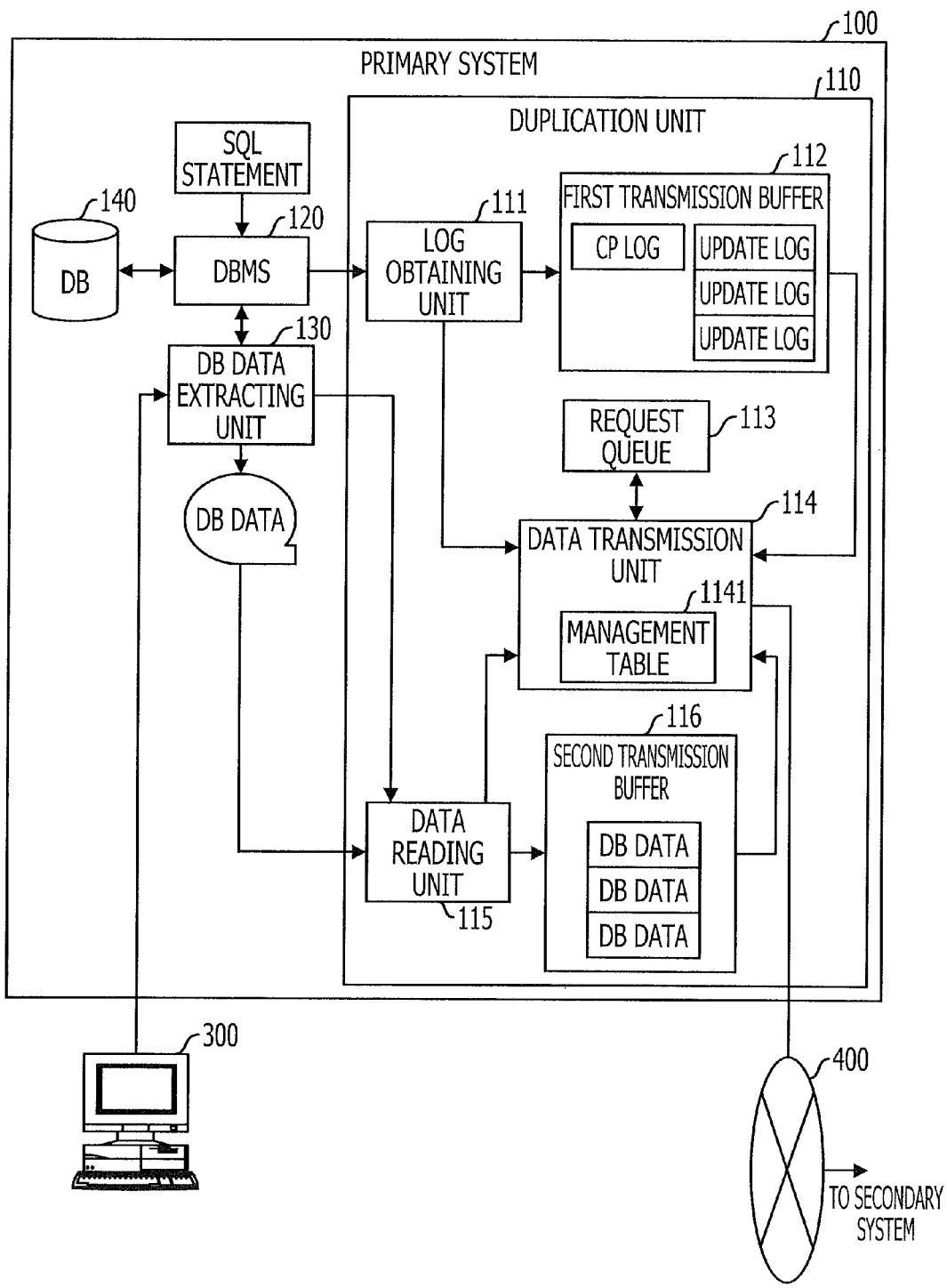
FIG. 4 illustrates an example of the functional blocks of a primary system according to the embodiment.
Figure 5:
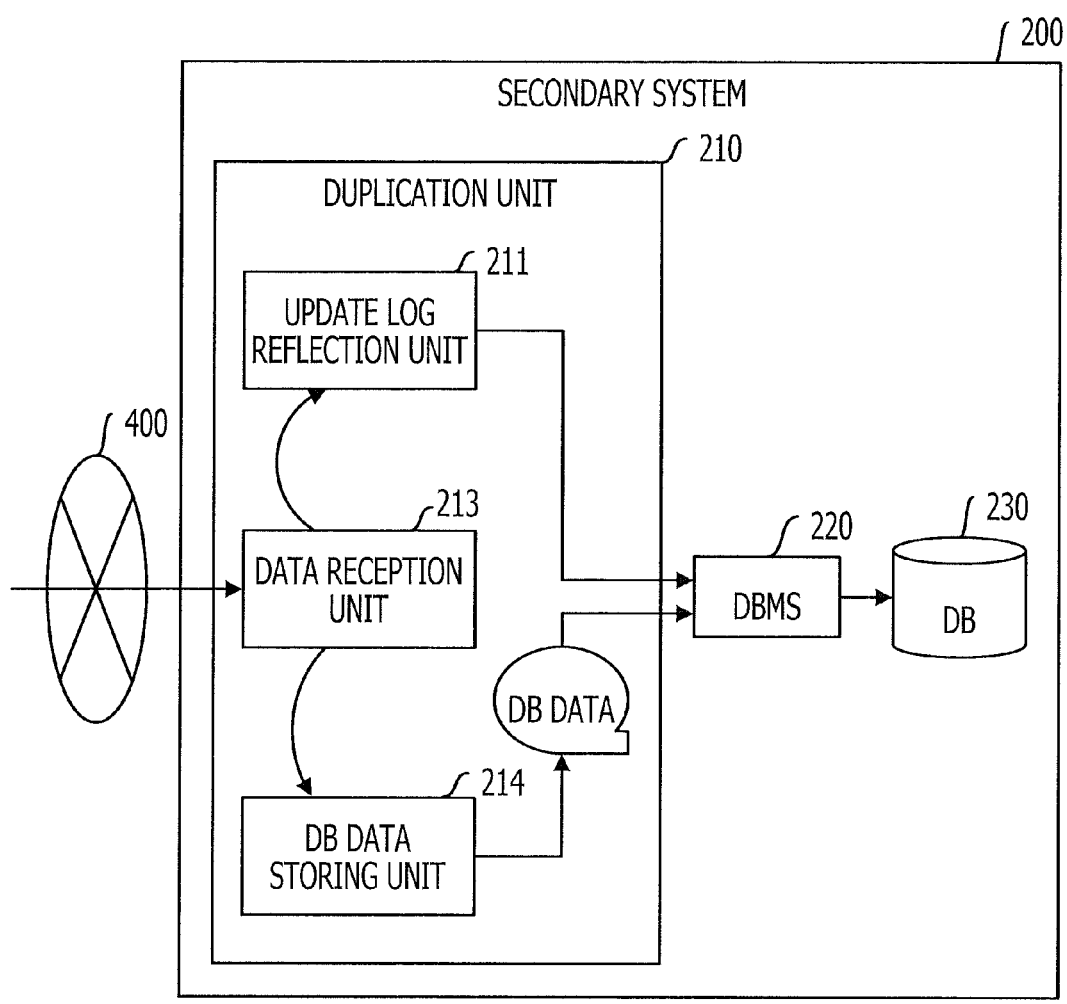
FIG. 5 illustrates an example of the functional blocks of a secondary system according to the embodiment.

FIGS. 4 and 5 illustrate a system configuration according to an embodiment. As illustrated in FIG. 4, a primary system 100, which is a computer system, is connected to an administrator terminal 300, which is, for example, a personal computer operated by an administrator or the like, and a transfer path 400, which is connected to a secondary system 200, which is an external computer system. The primary system 100 includes a DB 140, a DBMS 120 that manages the DB 140, a DB data extracting unit 130 that extracts DB data from the DB 140, and a duplication unit 110 that performs processing for data transfer to the secondary system 200 via the transfer path 400.

The duplication unit 110 includes a log obtaining unit 111 that acquires data of a log generated by the DBMS 120, a data reading unit 115 that performs processing for obtaining DB data from the DB data extracting unit 130, a first transmission buffer 112 that stores data of a log, a second transmission buffer 116 that stores DB data, a data transmission unit 114 that performs processing for transmitting a log and processing for transmitting DB data, and a request queue 113 for managing requests and the like from the log obtaining unit 111 and the data reading unit 115. The data transmission unit 114 performs processing for reading and transmitting data for a request that is determined to be a transmission target from either the first transmission buffer 112 or the second transmission buffer 116.

The secondary system 200 illustrated in FIG. 5 includes a DB 230, a DBMS 220 that manages the DB 230, and a duplication unit 210 that processes an update log and DB data. The duplication unit 210 includes a data reception unit 213, an update log reflection unit 211, and a DB data storing unit 214.

The data reception unit 213 of the duplication unit 210 in the secondary system 200 receives log data from the primary system 100, and outputs the received log data to the update log reflection unit 211. The data reception unit 213 receives a DB file from the primary system 100, and outputs the received DB file to the DB data storing unit 214. The update log reflection unit 211 causes the DBMS 220 to update the DB 230 with reference to the update log. The DB data storing unit 214 causes the DBMS 220 to write DB data to the DB 230. Since processing performed by the duplication unit 210 in the secondary system 200 is performed in a method similar to a known method, the processing will not be explained.

In a system such as that described above, an administrator or the like instructs, using the administrator terminal 300, the DB data extracting unit 130 to extract data, while specifying the identifier of a database resource from which the data is to be extracted and a guaranteed transfer completion time. In accordance with this, the DB data extracting unit 130 requests the DBMS 120 to extract DB data for the specified database resource, and acquires from the DBMS 120 the DB data corresponding to the request.

At this time, the DBMS 120 acquires a checkpoint log representing the update status of the extracted DB data. FIG. 6 illustrates an example of the format of a checkpoint (CP) log. In the example illustrated in FIG. 6, the format contains a CP type, the database resource identifier (ID) of a database resource serving as a source of the extracted DB data, and update status data representing the update status of the database resource from which data is extracted. In this embodiment, the CP type represents whether or not DB updating of a database resource serving as a source of extracted DB data is possible. For example, if a service for the database resource is operating, DB updating is possible. If a service for the database resource is stopped, DB updating is not possible. Depending on the case, a checkpoint log representing extraction of DB data may be output to the duplication unit 210 only if DB updating is possible. In this case, a checkpoint log might not contain data of the CP type.

In general, a checkpoint log representing the update status of DB data is utilized for order guarantee in which after DB data that is transferred from a primary system to a secondary system is stored in the DB of the secondary system, an update log generated after extraction of the DB data is applied to the DB. In this embodiment, a checkpoint log may be used for a different purpose.

Figure 7:
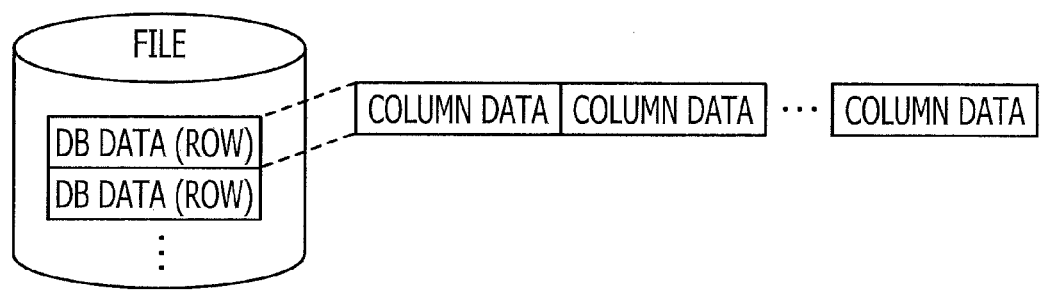
FIG. 7 illustrates an example of the format of DB data.

FIG. 7 illustrates an example of the data format of DB data. In this embodiment, files are formed of units of database resources. A file contains data of a plurality of rows contained in a database resource. Furthermore, data in a single row contains data of a plurality of columns. DB data might not be in a file format.

When receiving an SQL statement involving DB updating for a certain service, the DBMS 120 updates the DB 140, and generates a corresponding update log. FIG. 8 illustrates an example of the format of an update log. In the example illustrated in FIG. 8, the format contains an operation type (insert, update, or delete), a database resource identifier (ID), a primary key for identifying a row (however, omitted if contained in updated data), and updated data (after image (binary data) of updated data).

Furthermore, when receiving a log from the DBMS 120, the log obtaining unit 111 stores a checkpoint log and an update log into the first transmission buffer 112, and outputs a log transmission request to the data transmission unit 114.

The DB data extracting unit 130 outputs a notification including the identifier of a database resource, the overall size (volume) of extracted DB data, and the guaranteed transfer completion time to the data reading unit 115, in accordance with an instruction from an administrator or the like. In accordance with the notification, the data reading unit 115 outputs a DB data start notification including the database resource ID to the data transmission unit 114. The DB data start notification may contain the overall size and the guaranteed transfer completion time. In this case, the processing of S21 and S23 described below may be omitted.

Furthermore, the data reading unit 115 divides DB data extracted by the DB data extracting unit 130 into data portions each having a certain size and stores the data portions into the second transmission buffer 116. The data reading unit 115 also outputs to the data transmission unit 114 a transmission request for each of the data portions generated by data division. Data regarding notifications is stored, for example, until a request is issued from the data transmission unit 114. After transmitting transmission requests for all the data portions of DB data, the data reading unit 115 outputs to the data transmission unit 114 a DB data completion notification containing the database resource ID.

The data transmission unit 114 stores an update log transmission request, a checkpoint log transmission request, a DB data transmission request, a DB data start notification, and a DB data completion notification in the request queue 113. For example, the request queue 113 has the structure illustrated in FIG. 9.

Figure 9:
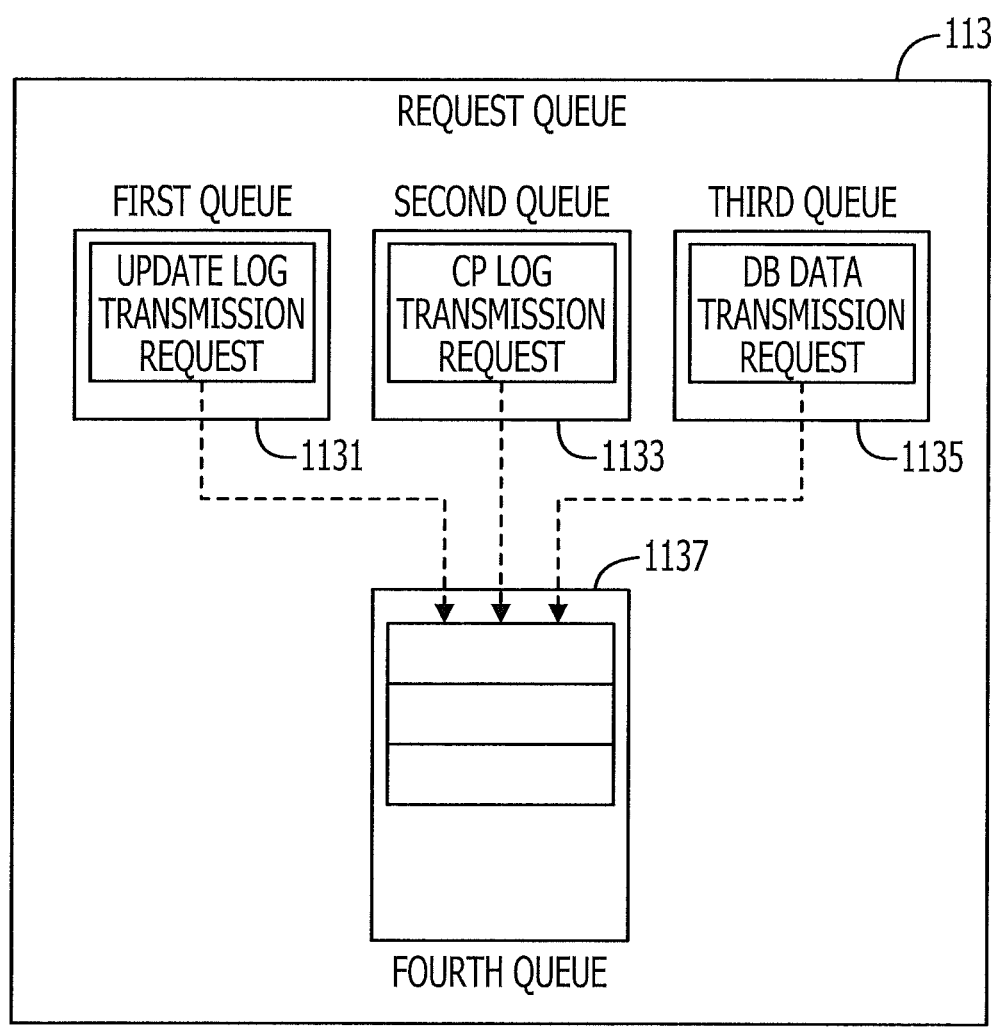
FIG. 9 illustrates an example of the structure of a queue.
Figure 12:
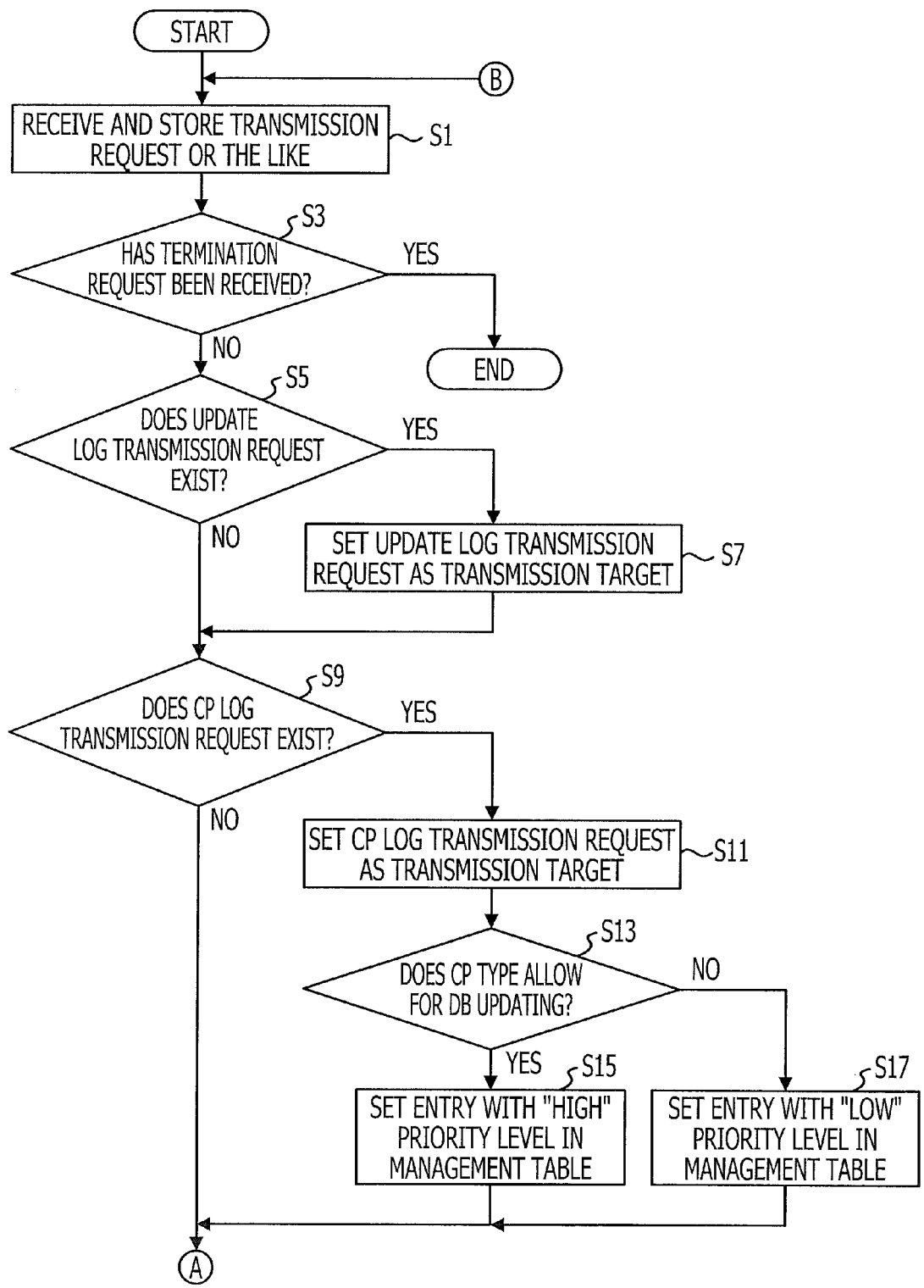
FIG. 12 illustrates the flow of a process performed by a data transmission unit.

In the example illustrated in FIG. 9, the request queue 113 contains a first queue 1131 in which one or more update log transmission requests is stored, a second queue 1133 in which one or more checkpoint log transmission requests is stored, a third queue 1135 in which one or more DB data transmission requests is stored, and a fourth queue 1137 in which one or more transmission requests determined to be a transmission target is stored. Fourth queues 1137 may be categorized into a queue for update log transmission requests, a queue for checkpoint log transmission requests, and a queue for DB data transmission requests, for example. Alternatively, fourth queues 1137 may be categorized into a queue for update log transmission requests and checkpoint log transmission requests and a queue for DB data transmission requests.

FIG. 10 illustrates an example of the data format of each entry of each queue in the request queue 113. In the example illustrated in FIG. 10, the data format contains a key type, a database resource ID for identifying a database resource in a copy destination database, the address of the next transmission request, and the address in a transmission buffer in which a log or DB data is stored. The queue type represents one of the first to fourth queues. If DB data for a plurality of database resources are transferred at the same period, a third queue 1135 may be arranged for each database resource.

The data transmission unit 114 stores a management table 1141 to manage the data transfer status of DB data. Each entry of the management table 1141 has, for example, the data format illustrated in FIG. 11. In the example illustrated in FIG. 11, the data format contains a database resource ID for identifying a database resource in a copy destination database, a priority level, the overall size, the guaranteed transfer completion time, the amount of transmitted data, the transmission start time, and the address of the next entry in the management table 1141. The priority level will be explained later in detail. Initially, the priority level is set to "low", but, depending on the case, the priority level is set to "high". The database resource ID, the overall size, and the guaranteed transfer completion time are data acquired from the data reading unit 115. As explained later, the average transmission speed is calculated with reference to the amount of transmitted data and the transmission start time.

Processing performed by the data transmission unit 114 will now be explained with reference to FIGS. 12 to 22. The data transmission unit 114 waits for a transmission request or the like from either the log obtaining unit 111 or the data reading unit 115. When receiving a transmission request or the like of a particular type, the data transmission unit 114 stores the received transmission request or the like in a queue, corresponding to the particular type, in the request queue 113 (S1 of FIG. 12). The data transmission unit 114 also receives a DB data start notification and a DB data completion notification from the data reading unit 115. These notifications are stored in the third queue 1135, which is the same as the queue for a DB data transmission request, in order to maintain the order of processing.

As described above, an update log and a checkpoint log (CP log) for extraction of DB data are stored in the first transmission buffer 112. Extracted DB data is divided into a plurality of data portions and stored in the second transmission buffer 116.

In this embodiment, for example, the processing described below is repeatedly performed, for example, for initial requests or the like of the first to third queues 1131 to 1135 until, for example, a process termination request is received from the administrator terminal 300 or the like (S3). When a termination request is received, the process is terminated.

If a termination request has not been received, the data transmission unit 114 determines whether or not an update log transmission request is stored in the first queue 1131 of the request queue 113 (S5). If an update log transmission request is stored in the first queue 1131, the data transmission unit 114 sets the update log transmission request as a transmission target (S7). More specifically, the data transmission unit 114 moves the update log transmission request to the fourth queue 1137. Then, the process proceeds to S9.

If an update log transmission request is not stored in the first queue 1131 of the request queue 113 or after the processing of S7 is performed, the data transmission unit 114 determines whether or not a CP log transmission request is stored in the second queue 1133 of the request queue 113 (S9). If a CP log transmission request is stored in the second queue 1133, the data transmission unit 114 sets the CP log transmission request as a transmission target (S11). Then, the data transmission unit 114 determines whether the CP type of the CP log stored in the first transmission buffer 112 represents that DB updating is possible (S13). Here, the CP log has the data format illustrated in FIG. 6. However, if a transmission request is output only when DB updating for a CP log is possible, the process omits the determination processing in S13 and proceeds to S15.

If the CP type represents that DB updating is allowed, the data transmission unit 114 sets an entry in which "high" priority level is set for the CP log transmission request in the management table 1141 (S15). More specifically, an entry including a database resource ID contained in the CP log and "high" priority level is registered in the management table 1141. In this fashion, by setting the priority level as equivalent to that for an update log or the like, transfer of DB data may be completed early. Then, the process proceeds via a terminal A to S21 of FIG. 13.

If the CP type represents that DB updating is not possible, the data transmission unit 114 sets an entry in which "low" priority level is set for the CP log transmission request in the management table 1141 (S17). More specifically, an entry including a database resource ID contained in the CP log and "low" priority level is registered in the management table 1141. As described above, basically, the priority level for transfer of DB data is lower than the priority level for transfer of an update log or the like, except for a specific case in which a recovery operation is performed while a service for a database resource is operating in the state where DB updating is possible.

Figure 13:
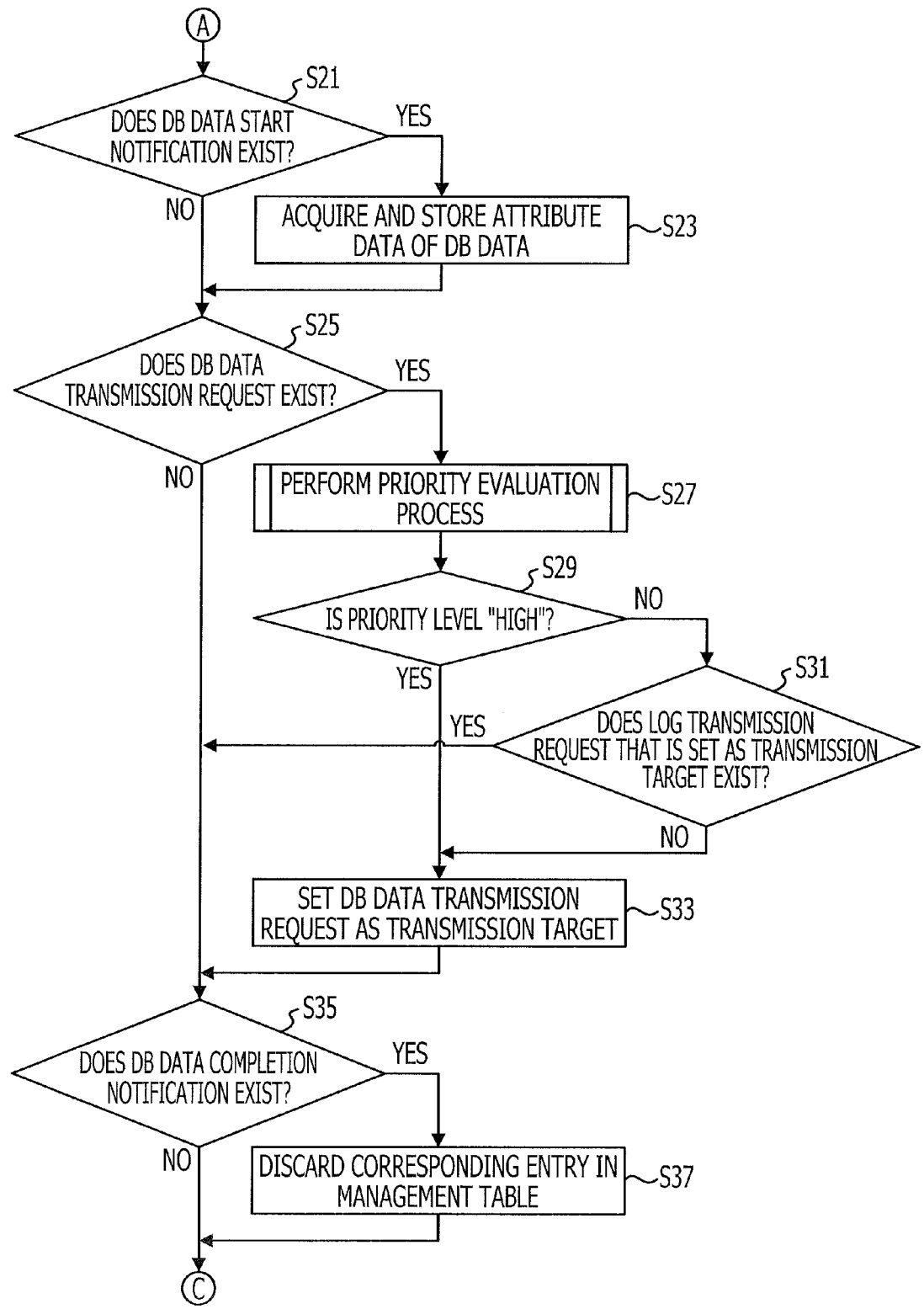
FIG. 13 illustrates the flow of a process performed by the data transmission unit.

The process then proceeds via the terminal A to S21 of FIG. 13. If it is determined in S9 that a CP log transmission request is not stored in the second queue 1133, the process also proceeds via the terminal A to S21 of FIG. 13.

Referring to FIG. 13, the data transmission unit 114 determines whether or not a DB data start notification exists in the third queue 1135 (S21). If a DB data start notification exists, the data transmission unit 114 acquires from the data reading unit 115 attribute data (the overall size and the guaranteed transfer completion time) for a database resource ID contained in the DB data start notification, and stores the acquired attribute data into a corresponding entry of the management table 1141 (S23). For example, data of the entry illustrated in FIG. 14 is stored in the management table 1141. In the example illustrated in FIG. 14, for an entry identified by a database resource ID in which the database schema name is "S1" and the table name is "Company Table", the priority level of "low", the overall size of "5 megabytes", and the guaranteed transfer completion time of "13:00 5/12/2011" are registered. Since transmission has not yet been performed, data for the amount of transmitted data and the transmission start time is not registered. If the next entry does not exist, the address of the next entry is not registered. Since a DB data start notification and a DB data completion notification are not to be transmitted to the secondary system 200, these notifications are discarded at this step.

After the processing of S23 is performed or if a DB data start notification is not stored in the third queue 1135, the data transmission unit 114 determines whether or not a DB data transmission request is stored in the third queue 1135 (S25). If a DB data transmission request is stored in the third queue 1135, the data transmission unit 114 performs a priority evaluation process (S27). The priority evaluation process will be explained with reference to FIG. 15.

Figure 15:
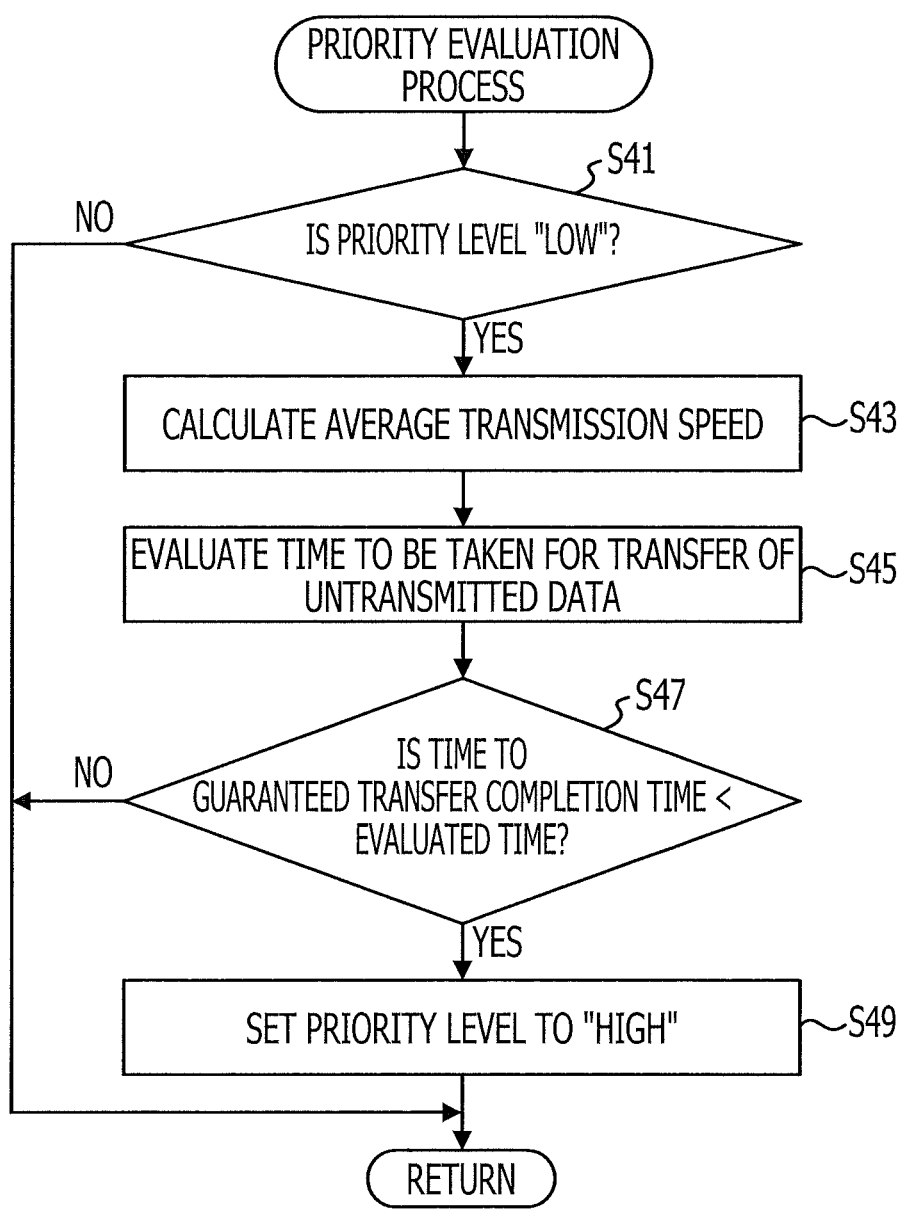
FIG. 15 illustrates the flow of a priority evaluation process.

In the priority evaluation process, the data transmission unit 114 determines whether or not "low" priority level is set in the corresponding entry in the management table 1141 (S41 of FIG. 15). If "high" priority level has already been set by a CP log, DB data is transferred at "high" priority level. Therefore, changing processing is not necessarily performed in the priority evaluation process. Consequently, if "high" priority level is set, the process returns to the calling process.

Figure 17:
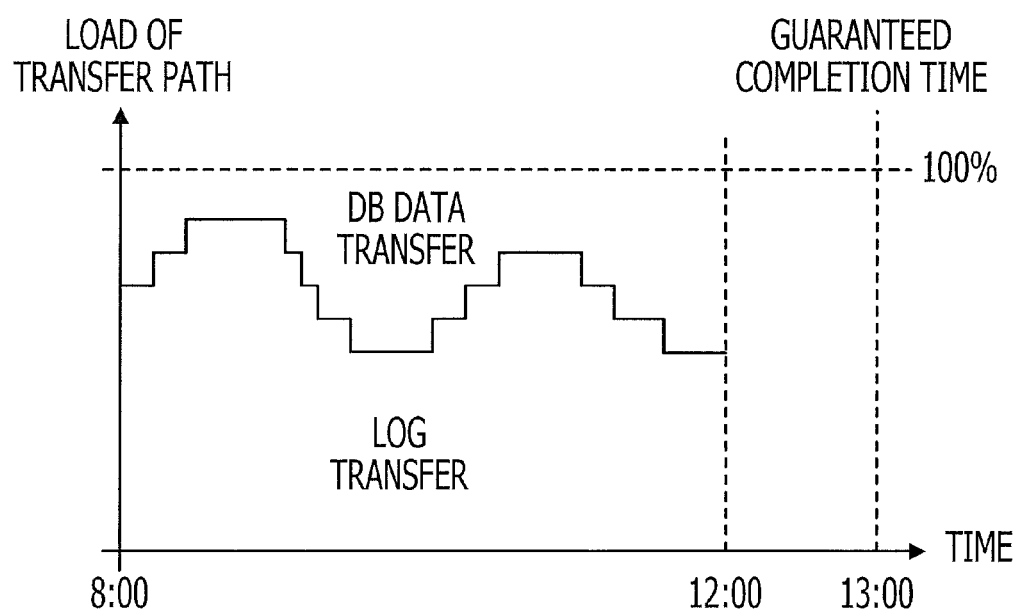
FIG. 17 illustrates an example of the bandwidth used for a transfer path.

If "low" priority level is set, the data transmission unit 114 calculates the average transmission speed for DB data, and stores the calculated average transmission speed into a storage device, such as, for example, a main memory (S43). For example, it is assumed that the entry of the management table 1141 illustrated in FIG. 16 exists. In the example illustrated in FIG. 16, it is assumed that transmission starts at "8:00 5/12/2011" and data of "3.6 megabytes" has been transmitted by the current time "12:00 5/12/2011". As explained below, even when "low" priority level is set, if an update log or the like does not exist in a queue, DB data is transmitted. That is, as illustrated in FIG. 17, one part of the bandwidth of a transfer path is used to transfer a log, and the other part is used to transfer DB data. However, if an update log or the like does not exist in a queue, DB data is transmitted. Thus, fixed parts of the bandwidth of the transfer path are not allocated for transfer of a log and transfer of DB data. The proportion of the bandwidth allocation varies over time. Thus, the average transmission speed is calculated by dividing the amount of data that has been transmitted at the time when the processing of S43 is performed by the time since the transmission start time. In the example illustrated in FIG. 16, 0.9 megabytes/ hour (=3.6 megabytes/4 hours) is calculated as the average transmission speed.

Figure 18:
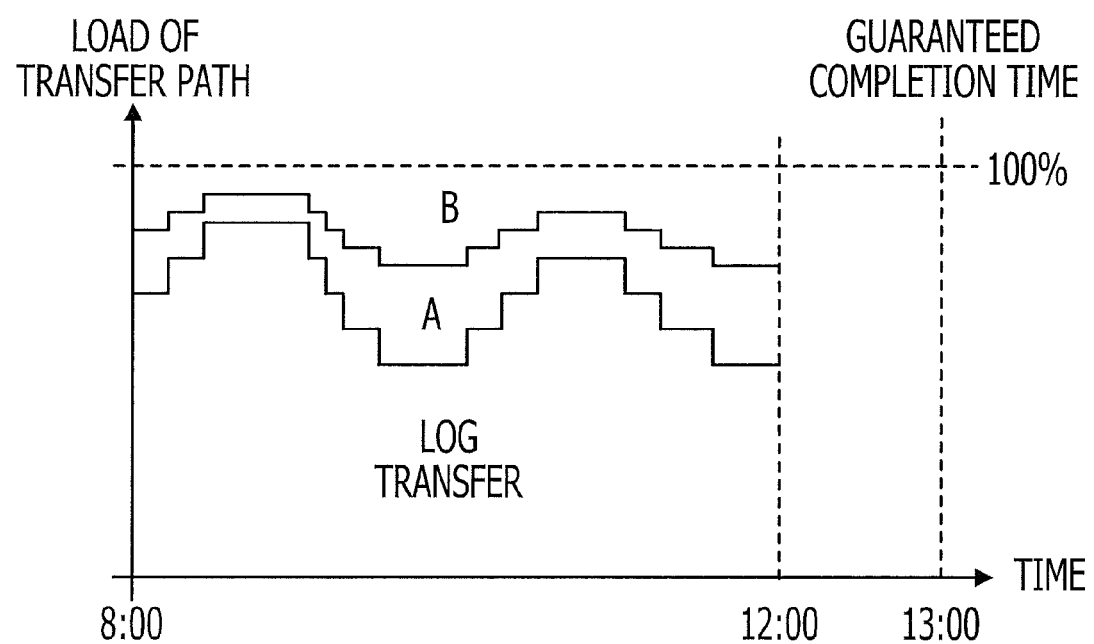
FIG. 18 illustrates an example of the bandwidth used for the transfer path.

DB data for a plurality of database resources may be transferred at the same time. For example, if DB data for two database resources are transferred at the same time, when "low" priority level is set for the DB data for both the database resources, the same bandwidth as that illustrated in FIG. 17 is used for an update log or the like, as illustrated in FIG. 18. However, the bandwidth for transfer of DB data is divided into a bandwidth A and a bandwidth B, as illustrated in FIG. 18. Thus, in S43, the average transmission speed is calculated for each database resource.

Then, the data transmission unit 114 evaluates, using the average transmission speed, the time to be taken for transfer of non-transmitted data (S45). More specifically, the value obtained by subtracting the amount of transmitted data from the overall size is divided by the average transmission speed. In order to allow a margin, a specific value may be added to the value obtained by the above-mentioned calculation. In the example explained above, 1.56 hours (=(5−3.6)/0.9) is calculated.

Then, the data transmission unit 114 determines whether or not the time evaluated in S45 is longer than the time to the guaranteed transfer completion time (S47). The time to the guaranteed transfer completion time is calculated by subtracting the current time from the guaranteed transfer completion time. In the example explained above, the time to the guaranteed transfer completion time is 1 hour (=13:00−12:00), and the evaluated time is 1.56 hours. Thus, the evaluated time is longer than the time to the guaranteed transfer completion time. In this case, transfer of DB data is less likely to be completed by the guaranteed transfer completion time.

If the evaluated time is longer than the time to the guaranteed transfer completion time, the data transmission unit 114 changes the priority level for the corresponding entry in the management table 1141 to "high" (S49). That is, the state where priority is given to transfer of an update log is changed to the state where priority is equally given to both the transfer of an update log and transfer of DB data. Then, the process returns to the calling process.

Figure 19:
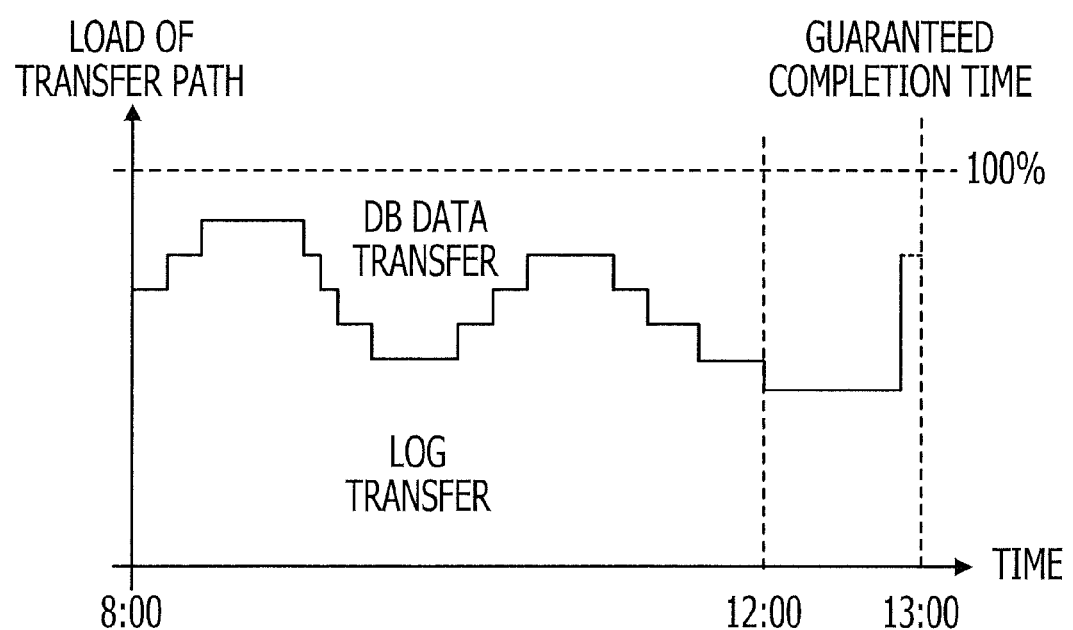
FIG. 19 illustrates an example of the bandwidth used for the transfer path.

In this case, as schematically illustrated in FIG. 19, "high" priority level is set from the current time "12:00" until the transfer of DB data completes, and a bandwidth wider than usual is used to transfer DB data. Accordingly, transfer of DB data is completed before the guaranteed transfer completion time, and the bandwidth to be used for transfer of a log is returned to the original state.

If the evaluated time is less than or equal to the time to the guaranteed transfer completion time, even if "low" priority level is set at the current time, the transfer of DB data is scheduled to be completed by the guaranteed transfer completion time. Thus, the priority level is not changed. That is, the process returns to the calling process.

Figure 20:
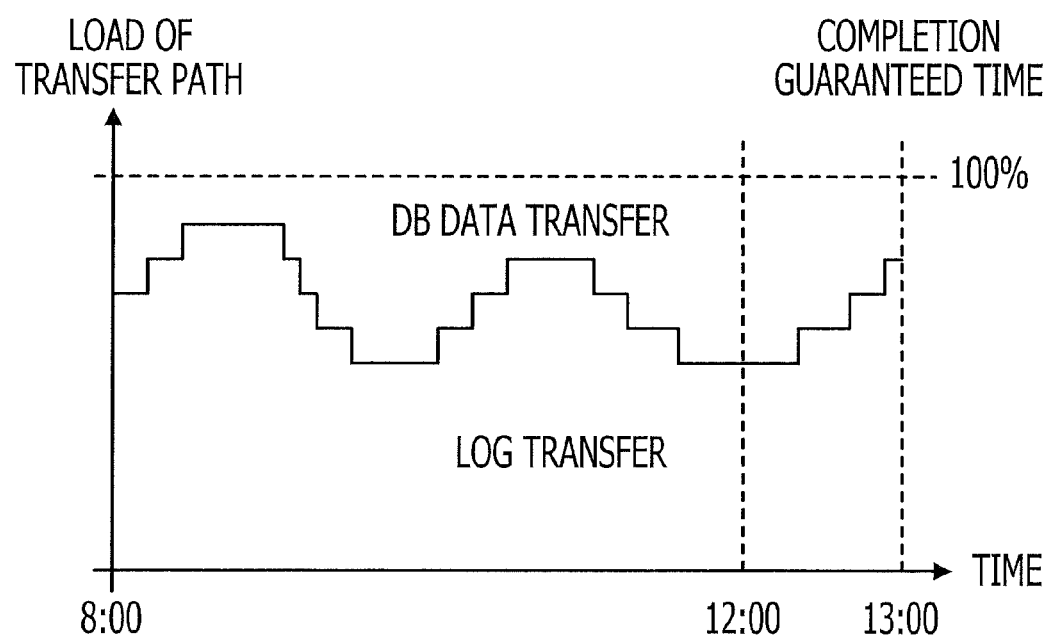
FIG. 20 illustrates an example of the bandwidth used for the transfer path.

In this case, priority is given to log transfer. However, if a log does not exist in a queue, DB data is transferred. Thus, as schematically illustrated in FIG. 20, the bandwidth to be used to transfer DB data is the remaining part of the bandwidth used for log transfer.

Figure 21:
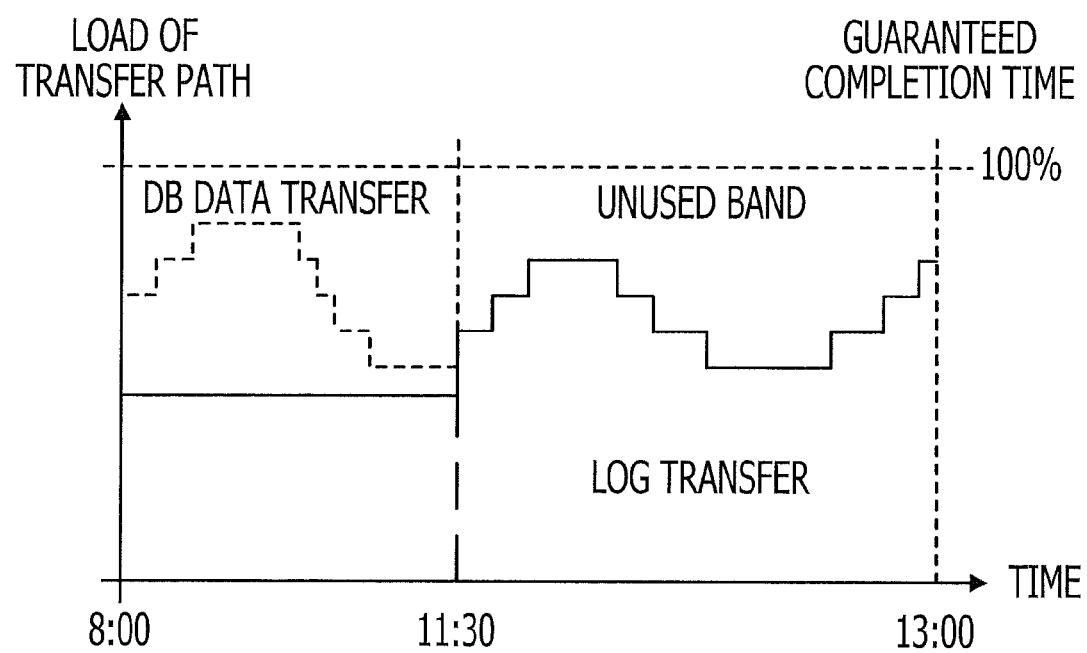
FIG. 21 illustrates an example of the bandwidth used for the transfer path.

If "high" priority level is set in a CP log, as schematically illustrated in FIG. 21, priority is equally given to both the transfer of DB data and transfer of a log from the start of transmission. DB data is transferred at high speed compared to the case where "low" priority level is set as indicated by the dotted line in FIG. 21. For example, transfer of DB data is completed about 11:30, and the state where priority is given only to transfer of a log (an update log or a CP log) is recovered.

As described above, it is determined, in accordance with the data transfer status, whether or not a "low" priority level, which is lower than the priority level for an update log or the like, is to be changed to a "high" priority level. If transfer of DB data is less likely to be completed by the guaranteed transfer completion time, a "high" priority level, which is equivalent to the priority level for an update log or the like, is set.

Referring back to FIG. 13, after the processing of S27 is performed, the data transmission unit 114 determines whether or not "high" priority level is set for the corresponding entry in the management table 1141 for the database resource relating to the DB data transmission request (S29). If "high" priority level is set, the process proceeds to S33, where the data transmission unit 114 sets the DB data transmission request relating to the processing as a transmission target. More specifically, the DB data transmission request relating to the processing is moved to the fourth queue 1137. Then, the process proceeds to S35.

If "low" priority level is set, the data transmission unit 114 determines whether or not an update log transmission request that is set as a transmission target or a CP log transmission request that is set as a transmission target exists (S31). More specifically, the data transmission unit 114 checks if an update log transmission request or a CP log transmission request is stored in the fourth queue 1137. If a log transmission request that is set as a transmission target exists, the process proceeds to S35. If a log transmission request that is set as a transmission target does not exist, the process proceeds to S33. That is, since no log to be transmitted exists, DB data is transmitted.

The data transmission unit 114 determines whether or not a DB data completion notification exists in the third queue 1135 (S35). If a DB data completion notification is stored in the third queue 1135, transfer of DB data relating to the DB data completion notification has been completed. Thus, the data transmission unit 114 discards the corresponding entry in the management table 1141 (S37). Then, the process proceeds via a terminal C to S51 of FIG. 22. If a DB data completion notification is not stored in the third queue 1135, the process also proceeds via the terminal C to S51 of FIG. 22.

Figure 22:
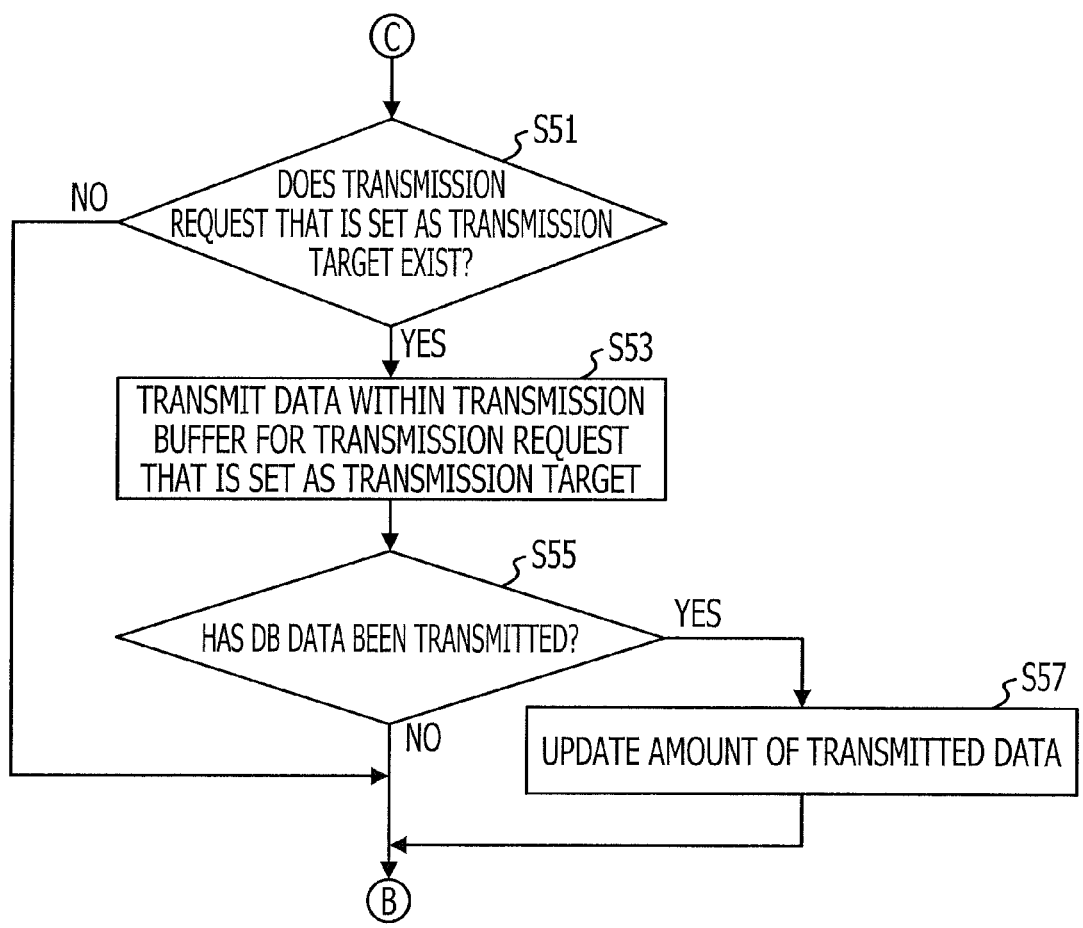
FIG. 22 illustrates the flow of a process performed by the data transmission unit.

Referring to FIG. 22, the data transmission unit 114 determines whether or not a transmission request that is set as a transmission target is stored in the fourth queue 1137 (S51). If no transmission request is stored in the fourth queue 1137, the process returns via a terminal B to S1 of FIG. 12. If a transmission request that is set as a transmission target is stored in the fourth queue 1137, the data transmission unit 114 transmits data stored in either the first transmission buffer 112 or the second transmission buffer 116 for the transmission request that is set as a transmission target to the secondary system 200 via the transfer path 400 (S53).

Then, if the data transmitted in S53 contains DB data (Yes in S55), the data transmission unit 114 updates the amount of transmitted data in the corresponding entry of the management table 1141 according to the database resource ID of the DB data in such a manner that the amount of transmitted data is increased by the amount of transmitted DB data (S57). Then, the process returns via the terminal B to S1 of FIG. 12. If the data transmitted in S53 contains no DB data (NO in S55), the process also returns via the terminal B to S1 of FIG. 12.

By performing processing such as the above, for example, the determination as to whether or not the priority level for DB data is to be changed from "low" to "high" may be appropriately made in accordance with whether or not a service for a database resource relating to a recovery operation is operating, and whether or not the transfer status of the DB data for the database resource relating to the recovery operation is able to guarantee the guaranteed transfer completion time. That is, a transfer path may be efficiently utilized in accordance with the status.

Furthermore, the influence on a user service for a normal database resource may be reduced to close to if not the minimum, thus contributing to a flexible recovery operation.

By transmitting data of the management table 1141 to the administrator terminal 300, the data transfer status may be presented to the administrator. For example, the administrator may change the guaranteed transfer completion time or may perform processing such as manually changing the priority level.

Furthermore, in the example explained above, it is assumed that a fault has occurred in the secondary system 200. However, this embodiment is also applicable to the case where DB data of a specific database resource is transmitted from a copy source DB in the primary system 100 to the secondary system 200 for a different reason.

Although the embodiment of this technique has been described above, this technique is not limited to the embodiment. For example, the functional block diagrams illustrated in FIGS. 4 and 5 are merely examples and might not correspond to the actual program module configuration. In particular, the duplication unit 110 may be integrated with the DBMS 120. Similarly, the duplication unit 210 may be integrated with the DBMS 220. Furthermore, the use methods and configurations of queues and buffers explained above are merely examples. In the case of implementation, various changes may be made. A queue may simply be a data storage part.

Furthermore, the processing flows explained above are merely examples. The processing order may be changed or a plurality of processing steps may be performed in a parallel manner as long as the processing results are not changed. For example, the data transmission unit 114 may perform processing steps in a parallel manner for each type of transmission request.

In addition, the example in which the priority level for a DB data transmission request is set to "high", which is the same level as that for a log transmission request, has been explained. However, if a larger number of priority levels may be set, the priority level for a DB data transmission request may be set higher than the priority level for a log transmission request.

The primary system 100 and the secondary system 200 each may be a single computer or each may share functions between a plurality of computers.

Figure 23:
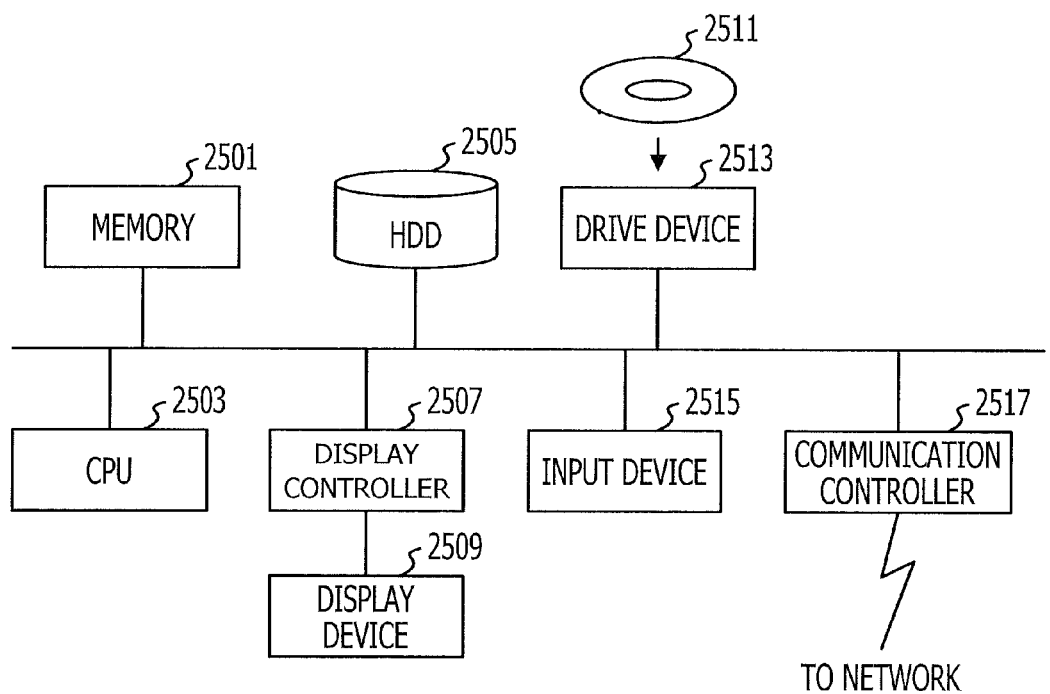
FIG. 23 illustrates an example of the functional blocks of a computer.

Each of the primary system 100 and the secondary system 200 is formed of one or more computers. As illustrated in FIG. 23, a memory 2501, a central processing unit (CPU) 2503, a hard disk drive (HDD) 2505, a display controller 2507 connected to a display device 2509, a drive device 2513 for a removable disk 2511, an input device 2515, and a communication controller 2517 allowing connection with a network are connected via a bus 2519. The input device 2515 includes, for example, a mouse and a keyboard. The communication controller 2511 is, for example, hardware for implementing a communication function, such as a network interface card (NIC). An operating system (OS) and one or more application programs for implementing processing in the embodiments are stored in the HDD 2505. The operating system and the application program are read from the HDD 2505 to the memory 2501 when being executed by the CPU 2503. The CPU 2503 controls the memory 2501, the display controller 2507, the communication controller 2517, and the drive device 2513 in accordance with the processing details of the application program, and causes the memory 2501, the display controller 2507, the communication controller 2517, and the drive device 2513 to perform specific operations. For example, if the computer illustrated in FIG. 23 is the primary system 100, the CPU 2503 causes the primary system 100 to perform operations of the DB 140, the DB data extracting unit 130, the first transmission buffer 112, the data transmission unit 114, the second transmission buffer 116, the request queue 113, the DBMS 120, and the like. For example, if the computer illustrated in FIG. 23 is the secondary system 200, the CPU 2503 causes the individual pieces of hardware illustrated in FIG. 23 to perform operations of the update log reflection unit 211, the data reception unit 213, the DB data storing unit 214, the DB 230, the DBMS 220, and the like. Data that is in the course of processing is usually stored in the memory 2501, but may be stored in the HDD 2505. In the embodiments of this technique, the application program for implementing the processing described above is stored in the removable disk 2511, which is readable by a computer, and is distributed. Then, the application program is installed using the drive device 2513 to the HDD 2505. The application program may be installed via a network such as the Internet and the communication controller 2517 to the HDD 2505. In a computer such as the computer described here, by organic cooperation between hardware, such as the CPU 2503 and the memory 2501, and a program, such as the OS and the application program, the various functions described above may be implemented. The CPU is an example of a processor which reads out and executes the application program. The processor is a hardware to carry out operations based on at least one program (such as the application program) and control other hardware, such as the CPU, a GPU (Graphics Processing Unit), FPU (Floating point number Processing Unit) and DSP (Digital signal Processor).

Features of the embodiments described above may be summarized as below.

A data communication method according to an embodiment includes (A) a step of receiving a first request for requesting transmission of first data, which includes the update content for a first database in a first system, to a second system that is connected to the first system via a transfer path and that includes a second database to store data identical to that stored in the first database, (B) a step of receiving a second request for requesting transmission of second data, which is at least part of the data in the first database, to the second system via the transfer path, (C) a step of determining, in accordance with at least one of the transfer status of the second data and the operating status of a service for at least a portion corresponding to the second data in the first database, whether or not a first state, in which transmission of the first data has a higher priority than transmission of the second data, is to be changed, and (D) a step of changing, if it is determined, in accordance with at least one of the operating status of the service and the transfer status of the second data, that the first state is to be changed, the first state to a second state, in which transmission of the second data has a priority greater than or equal to the priority of the transmission of the first data.

Accordingly, the state in which priority is given to the first data, which is a basic state, may be appropriately changed to the state in which priority is either shared with or given to the second data. Thus, data transfer appropriate for the status may be achieved.

In addition, the data communication method may further include (E) a step of receiving a third request for requesting transmission of third data to the second system, wherein the third data represents that data updating for at least the portion corresponding to the second data is allowed when the second data is extracted from the first database. In this case, in the determining step, it may be determined, in accordance with the third request, that the first state is to be changed. The third data represents that a service for a database resource for the second data is operating. Thus, in such a case, it is desirable that the second data be transmitted to the second system as soon as possible. Output of the third data may represent that data updating for at least the portion corresponding to the second data is allowed when the second data is extracted from the first database.

Furthermore, the data communication method may further include (F) a step of receiving a fourth request for requesting transmission of fourth data to the second system, wherein the fourth data represents whether or not data updating for at least the portion corresponding to the second data is allowed when the second data is extracted from the first database. In this case, the determining step may include (C1) a step of determining, in accordance with the fourth request, whether or not data updating is allowed by the fourth data and (C2) a step of determining, if the fourth data represents that data updating is allowed, that the first state is to be changed. If the fourth data is generated, the processing described above is performed.

In addition, the data communication method may further include (G) a step of managing, in accordance with reception of the second request, the guaranteed transfer completion time for the second data, the data amount of the second data, and the amount of the transmitted second data. In this case, the determining step may include (C3) a step of determining whether or not the time to be taken for transmission of the second data, which is evaluated from the transmission speed, the amount of the second data, and the amount of the transmitted second data, is longer than the time to the guaranteed transfer completion time and (C4) a step of determining, if the time to be taken for transmission of the second data is longer than the time to the guaranteed transfer completion time, that the first state is to be changed. As described above, if the guaranteed transfer completion time for the second data is designated, it may be estimated, from the current transfer status of the second data, that data transfer is expected not to be completed by the guaranteed transfer completion time. Thus, by determining, if the time to be taken for transmission of the second data is longer than the time to the guaranteed transfer completion time, that the first state is to be changed and by changing the state, data transfer of the second data may be completed by the guaranteed transfer completion time.

Figure 24:
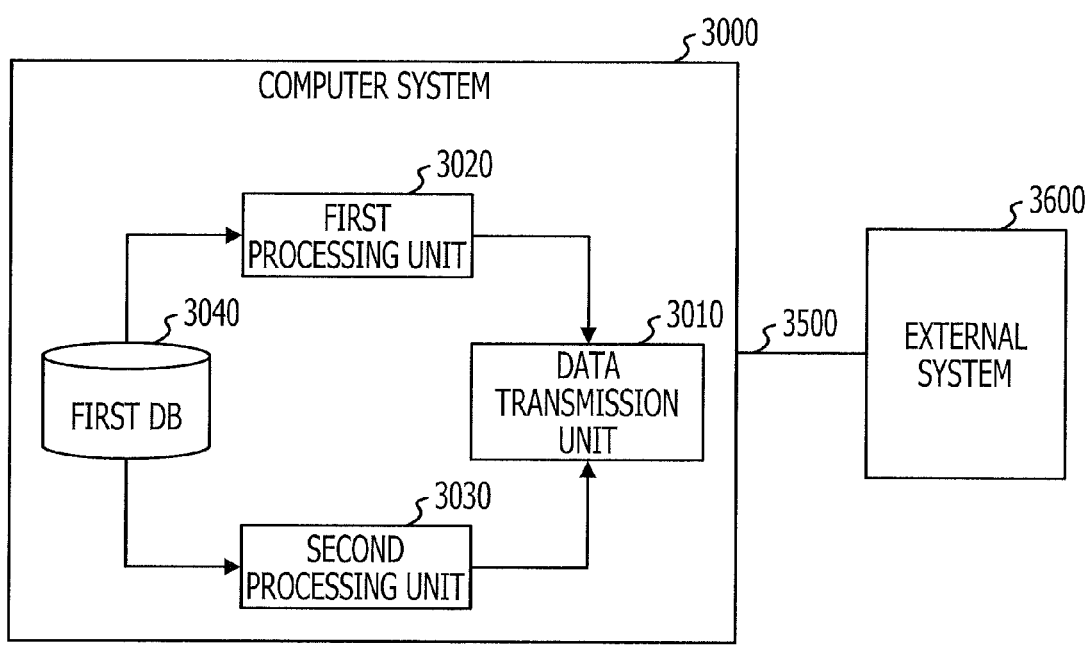
FIG. 24 illustrates an example of the functional blocks of a computer system according to the embodiment.

In addition, as illustrated in FIG. 24, a computer system 3000 connected to an external system 3600 via a transfer path 3500 includes (A) a data transmission unit 3010; (B) a first processing unit 3020 that outputs to the data transmission unit 3010 a first request for requesting transmission of first data, which includes the update content for a first database 3040 in the computer system 3000, to the external system 3600, which includes a second database to store data identical to that stored in the first database; and (C) a second processing unit 3030 that outputs to the data transmission unit 3010 a second request for requesting transmission of second data, which is at least part of data in the first database, to the external system 3600 via the transfer path 3500. The data transmission unit 3010 (A1) determines, in accordance with at least one of the operating status of a service for at least a portion corresponding to the second data in the first database and the transfer status of the second data, whether or not a first state, in which transmission of the first data has a higher priority than transmission of the second data, is to be changed. Then, (A2) if it is determined, in accordance with at least one of the operating status of the service and the transfer status of the second data, that the first state is to be changed, the data transmission unit 3010 changes the first state to a second state, in which transmission of the second data has a priority equal to or higher than transmission of the first data.

Figure 25:
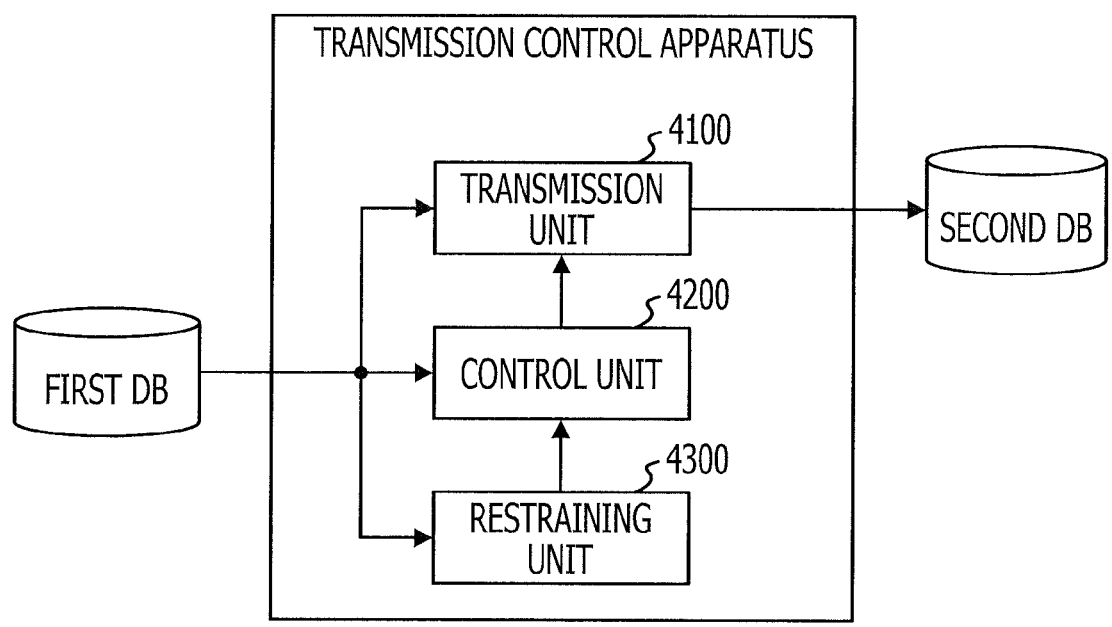
FIG. 25 illustrates an example of the functional blocks of a transmission control apparatus according to the embodiment.

Furthermore, as illustrated in FIG. 25, a transmission control apparatus according to an embodiment includes (A) a control unit 4200 that controls, for example, to cause first processing by a transmission unit 4100, in which an update log representing the update content of updating performed for a first database is transmitted to a second database serving as a copy destination for the first database, is performed with priority over second processing by the transmission unit 4100, in which transmission target data contained in the first database is transmitted to the second database; and (B) a restraining unit 4300 that restrains, if updating of the transmission target data is possible in the first database, the control that causes the first processing to be performed with priority.

A program for causing a computer to execute the processing described above may be created. The program is stored, for example, in a computer-readable storing medium, such as a floppy disk, an optical disk such as a compact disc read only memory (CD-ROM), a magneto-optical disk, a semiconductor memory (for example, a ROM), or a hard disk, or a storage device. Data in the course of processing is temporarily stored in the storage device such as a random access memory (RAM).

According to an aspect of the embodiments explained above, in a database duplication system, delay of data transfer from a primary system to a secondary system due to an increase in the amount of update processing for a database in the primary system may be limited if not suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable, non-transitory recording medium storing a transference control program that causes a computer to execute a procedure, the procedure comprising:

controlling, in a case that updating of first data is not allowed in a first database, an order of processing where the first processing is prioritized over a second processing, the first processing associated with transmission of an update log to a second database serving as a copy destination for the first database, the update log representing update content of an update of second data in the first database and the second processing associated with transmission of the first data to the second database; and restraining the controlling, in a case that updating of the first data is allowed in the first database.

2. The recording medium according to claim 1, wherein the procedure comprising:

obtaining, from the first data, update status data representing whether updating of the first data is allowed in the first database; and determining, in accordance with the update status data obtained, whether updating is allowed.

3. The recording medium according to claim 2, wherein the update status data is data which is used, in a system including the second database, to determine whether the update log for the first database is to be reflected in the second database.

4. The recording medium according to claim 1, wherein the procedure comprising:

restraining, in a case that an estimation time, being a processing time for transmission of the first data, is estimated to be longer than a specific time, the controlling causing the first processing to be performed with priority over the second processing.

5. A transference control method comprising:

controlling, in a case that updating of first data is not allowed in a first database, an order of processing where the first processing is prioritized over a second processing the first processing associated with transmission of an update log to a second database serving as a copy destination for the first database, the update log representing update content of an update of second data in the first database and the second processing associated with transmission of the first data to the second database; and restraining the controlling, in a case that updating of the first data is allowed in the first database.

6. The transference control method according to claim 5, comprising:

obtaining, from the first data, update status data representing whether updating of the first data is allowed in the first database; and determining, in accordance with the update status data obtained, whether updating is allowed.

7. The transference control method according to claim 6, wherein the update status data is data used, in a system including the second database, to determine whether the update log for the first database is to be reflected in the second database.

8. The transference control method according to claim 5, comprising:

restraining, in a case that an estimation time, being a processing time for transmission of the first data, is estimated to be longer than a specific time, the controlling causing the first processing to be performed with priority over the second processing.

9. A transference control apparatus comprising:

a communication controller; and a processor that executes a procedure, the procedure including controlling, in a case that updating of first data is not allowed in a first database, an order of processing where the first processing is prioritized over a second processing the first processing associated with transmission of an update log to a second database serving as a copy destination for the first database, the update log representing update content of an update of second data in the first database and the second processing associated with transmission of the first data to the second database; and restraining the controlling, in a case that updating of the first data is allowed in the first database.

10. The transference control apparatus according to claim 9, wherein the procedure comprising:

obtaining, from the first data, update status data representing whether updating of the first data is allowed in the first database; and determining, in accordance with the update status data obtained, whether updating is allowed.

11. The transference control apparatus according to claim 10, wherein the update status data is data used, in a system including the second database, to determine whether the update log for the first database is to be reflected in the second database.

12. The transference control method according to claim 9, wherein the procedure comprising:

restraining, in the case that an estimation time, being a processing time for transmission of the first data, is estimated to be longer than a specific time, the controlling causing the first processing to be performed with priority over the second processing.

* * * * *

UNITED STATES PATENT AND TRADEMARK OFFICE
CERTIFICATE OF CORRECTION

| | | |
|---|---|---|
| PATENT NO. | : 8,751,446 B2 | Page 1 of 1 |
| APPLICATION NO. | : 13/470463 | |
| DATED | : June 10, 2014 | |
| INVENTOR(S) | : Taniguchi et al. | |

It is certified that error appears in the above-identified patent and that said Letters Patent is hereby corrected as shown below:

In the Claims

Column 16, Line 34, in Claim 12, delete "method" and insert -- apparatus --, therefor.

Signed and Sealed this
Fourth Day of November, 2014

Michelle K. Lee
*Deputy Director of the United States Patent and Trademark Office*